Patented June 3, 1941

2,244,293

UNITED STATES PATENT OFFICE 2,244,293

AZO DYESTUFF FROM PARA-AMINO-PHENYL-ARSONIC ACID AND PROCESS FOR THE MANUFACTURE OF SAME

Ernst Albert Hermann Friedheim, Geneva, Switzerland

No Drawing. Application May 7, 1940, Serial No. 333,852. In Switzerland April 26, 1939

2 Claims. (Cl. 260—151)

In German patent specification No. 212,018 a process is described for the manufacture of azo dyestuffs from para-amino-phenyl-arsonic acid, which consists in combining the diazo compound of this acid with naphthols, naphthylamines, amino-naphthols or their sulphonic acids. The compounds obtained in accordance with the examples of the said patent specification have never been employed in medicine. On checking the therapeutic action on trypanosoma infection in the mouse (*T. equiperdum*) it was established that they are not only comparatively toxic but that they are also nearly or completely ineffective. In the most favourable case, i. e., in the case of the compound of Example 2 (coupling with R salt) the dosis maxima tolerata is 0.2 gram per kilogram and the dosis minima curativa is also 0.2 gram per kilogram; the therapeutic index thus amounts to 1:1.

It has now been found that the azo dyestuff of the formula

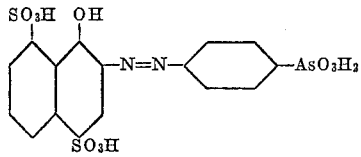

[Benzene-arsonic acid (4)]-<1-azo-2>-
[naphthol-(1)-disulphonic acid (4,8)]

obtainable by coupling diazotised para-amino-phenyl-arsonic acid with 1-naphthol-4,8-disulphonic acid, is not only non-toxic but is also very active therapeutically. The dosis maxima tolerata is higher than 4.0 grams per kilogram of mouse, the dosis minima curativa is 0.4 gram per kilogram in an equiperdum infection in the mouse in respect of which the dosis minima curativa with tryparsamide is 0.3 gram per kilogram of mouse. It must be emphasized that the new product causes no disorders of the nervous system whatever even maximal doses, whereas, for instance, tryparsamide in a dose of 2.5 grams per kilogram may lead to serious disorders of the central nervous system (dancing mice).

The same azo dyestuff can also be obtained by condensation of 1,2-naphthoquinone-4,8-disulphonic acid with para-hydrazino-phenyl-arsonic acid.

Example 1

3.1 parts by weight of para-amino-phenyl-arsonic acid are dissolved in 3.5 parts by weight of hydrochloric acid (s. g. 1.19) and 27 parts by weight of water and diazotised, while cooling with ice, with 0.7 part by weight of sodium-nitrite dissolved in 3.5 parts by weight of water. The diazo solution is allowed to flow into a cold solution of 3.3 parts by weight of 1-naphthol-4,8-disulphonic acid in 32.5 parts by weight of 20 per cent soda solution while stirring. When the coupling has been completed, the free dye salt is separated from the red solution in the form of fine, orange-red small felted needles by acidification with hydrochloric acid.

Example 2

3.8 parts by weight of 1,2-naphthoquinone-4,8-dipotassium-disulphonate are brought into a solution of 2.3 parts by weight of para-hydrazino-phenyl-arsonic acid in 1.5 parts by weight of hydrochloric acid (s. g. 1.19) and 21.5 parts by weight of water while stirring; the mixture goes into solution and becomes red. After stirring for a short time the mass solidifies into a crystalline paste consisting of small felted orange-red needles which are filtered off.

For the purpose of complete purification the crude product is dissolved in the calculated quantity of soda and again precipitated with hydrochloric acid.

The compound is easily soluble in water giving an orange-red colour which, on addition of alkali, becomes bluish-red. It is slightly soluble in methanol and is insoluble in acetone and benzene.

The calcium salt is easily soluble in hot water and crystallises in small orange-red shining silky needles.

I claim:

1. The [benzene-arsonic acid (4)]-<1-azo-2>-[naphthol-(1)-disulphonic acid (4,8)].

2. Process for the manufacture of [benzene-arsonic acid (4)]-<1-azo-2>-[naphthol-(1)-disulphonic acid (4,8)], comprising coupling the diazo compound of para-amino-phenyl-arsonic acid with 1-naphthol-4,8-disulphonic acid.

ERNST ALBERT HERMANN FRIEDHEIM.